(12) United States Patent
Miyazaki et al.

(10) Patent No.: US 6,477,254 B1
(45) Date of Patent: Nov. 5, 2002

(54) NETWORK SYSTEM USING A THRESHOLD SECRET SHARING METHOD

(75) Inventors: Seiji Miyazaki, Higashimurayama (JP); Kazuo Takaragi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/246,845

(22) Filed: Feb. 9, 1999

(30) Foreign Application Priority Data

Feb. 13, 1998  (JP) .......................................... 10-031636

(51) Int. Cl.$^7$ .............................. H04L 9/08; H04L 9/30
(52) U.S. Cl. ......................... 380/286; 380/30; 380/283
(58) Field of Search ........................... 380/28, 30, 283, 380/285, 286

(56) References Cited

U.S. PATENT DOCUMENTS

| | | | |
|---|---|---|---|
| 5,764,772 A | 6/1998 | Kaufman et al. .............. | 380/30 |
| 6,141,421 A | 10/2000 | Takaragi ...................... | 380/30 |
| 6,236,729 B1 * | 5/2001 | Takaragi et al. ............. | 380/286 |

OTHER PUBLICATIONS

SecureWay Key Recovery Technology, http://www˜4.ibm.com/software/security/keyworks/library/whitepapers/keyrec.html, Jan. 27, 1997.
IBM SecureWat Key Recovery Technology, http://www˜4.ibm.com/software/security/keyworks/library/whitepapers/keyrec2.html, Jan. 27, 1997.
BIT, Lecture, Feb. 1996, vol. 28, No. 2.
"Fair Cryptosystems" by S. Micali, Aug. 11, 1994.
ISO/IEC 10118–2, "Information Technology–Security Techniques–Hash Functions: Part 2: Hash–Functions using an N–Bit Block Cipher Algorithm" (1994).
"The MD5 Message Digest Algorithm" by R. Rivest, IETF RFC 1321 (1992).
Koyama et al, Elliptical Curve Cryptosystems and Their Applications, IEICE Trans. INF & System, E75–D, pp. 50–57, Jan. 1992.
B. Schneier, Applied Crytography, 2e, John Wiley pp. 70–73, Oct. 1995.
IBM SecureWay Key Recovery Technology, http://www.ibm–com/security/html/prkeyrec.html, Jan. 27, 1997.
IBM Comparison to Alternatives, http://www˜4.ibm.com/software/security/keywords/library/whitepapers/keyrec3.html, Jan. 27, 1997.
A.Shamir, "How to Share a Secret", In Communications of the ACM, vol. 22, No. 11, pp. 616–613, 1979.
T.P. Pedersen, "Distributed Provers with Applications to Undeniable Signatures", In Proc. of Eurocrypt '91, Lecture Notes in Computer Science, LNCS 547, Springer Verlag, pp. 221–238, 1991.

(List continued on next page.)

*Primary Examiner*—Justin T. Darrow
(74) *Attorney, Agent, or Firm*—Antonelli, Terry, Stou & Kraus, LLP

(57) ABSTRACT

In a data encryption/decryption method including an encryption step and a decryption step. In the encryption step, there are prepared n pairs of secret keys and public keys in a public-key cryptographic scheme, where n is a positive integer. A new key is generated in accordance with at least one of the public keys. Data is encrypted in a common-key cryptographic scheme by use of the new key. There is prepared a (k,n) threshold logic (k is an integer equal to or less than n) having terms associated with the new key and the n public keys. A calculation of the threshold logic is conducted by use of the new key and the n public keys, and encrypted data and a result of the calculation of the threshold logic are stored. In the decryption step, the new key is restored from k secret keys selected from the n secret keys and the stored result of the threshold logic calculation in accordance with a threshold reverse logic corresponding to the threshold logic and stored data is decrypted by the restored key in the common-key cryptographic scheme.

14 Claims, 5 Drawing Sheets

OTHER PUBLICATIONS

T.P.Pedersen, "A Threshold Cryptosystem without a Trusted Party", in Proc. of Eurocrypt '91, Lecture Notes in Computer Science, LNCS 547, Springer Verlag, pp. 522–526, 1991.

R. Gennaro, S. Jarecki, H. Krawczyk and T.Rabin, "Robust Threshold DSS Signatures", In Proc. of Eurocrypt '96, Lecture Notes in Computer Science, LNCS 1070, Springer Verlag, pp. 354–371, 1996.

C.Park and K.Kurosawa, "New ElGamal Type Threshold Digital Signature Scheme", IEICE Trans. Fundamentals, E79–A(1) :86–93, Jan. 1996.

K.Koblitz, "Algebraic Aspects of Cryptography", Algorithms and Computation in Mathematics vol. 3, ACM 3, 1998.

* cited by examiner

NETWORK SYSTEM USING A THRESHOLD SECRET SHARING METHOD

CROSS-REFERENCES TO RELATED APPLICATIONS

This application relates to U.S. Ser. No. 08/986,390 filed on Dec. 8, 1997 by Kazuo Takaragi et al, now U.S. Pat. No. 6,141,421 and U.S. Ser. No. 09/092,140 filed on Jun. 5, 1998 by Kazuo Takaragi et al, now U.S. Pat. No. 6,236,729. Both applications are assigned to the present assignee. The contents of those applications are incorporated herein by references.

BACKGROUND OF THE INVENTION

The present invention relates to a security technology on a computer network.

In an operation to keep secret information such as a secret key used in a public key cryptosystem, there exit a fear of losing and/or destroying the secret information as well as a fear that the secret information is stolen. Such loss and destruction of the secret information can be coped with by producing several copies of the information. However, when many copies are produced, the fear of stealing of the information is increased.

To solve these problems, there have been introduced secret sharing methods including a (k,n) threshold secret sharing method. In relation thereto, Shamir's will be described.

Assume that a polynomial f(x) of degree of k−1 has secret information s as a constant term thereof $$f(x)=s+a_1x+a_2x^2+\ldots+a_{k-1}x^{k-1}(\mod r)$$

where, r is a prime number.

Under this condition, a distributor delivers shared information wi=f(i) to each secret sharing bearer i(i=1, 2, ..., n). For details, reference is to be made to "How to Share a Secret" written by A. Shamir in pages 612 to 613 of Commun. of ACM, Vol. 22, No. 11, 1979.

On the other hand, the public key cryptosystems includes elliptic curve cryptosystems. Details about elliptic curve cryptosystems and operation on elliptic curves have been described in Chapter 6 of "Algebraic Aspects of Cryptography" written by Neal Koblitz in ACM, Vol. 3, 1998 and published from Springer.

However, when conducting encryption and decryption of information by use of the Shamir's (k,n) threshold secret sharing method of the prior art, there arise two problems as follows.

(1) The secret information is known to the distributor.
(2) There is required a distributor organization to produce secret sharing information.

SUMMARY OF THE INVENTION

It is therefore an object of the present invention to provide a highly reliable and safe secret sharing method, a data management system using the same, constituent apparatuses to implement the system, and a program to be executed therein.

In accordance with the present invention, there is provided a data encryption/decryption method comprising an encryption step and a decryption step. The encryption step includes the following steps of preparing n pairs of secret keys and public keys in a public-key cryptographic scheme, where n is a positive integer, generating a new key in accordance with at least one of the public keys, encrypting data in a common-key cryptographic scheme by use of the new key, preparing a (k,n) threshold logic (k is an positive integer equal to or less than n) having terms associated with the new key and the n public keys, conducting a calculation of the threshold logic by use of the new key and the n public keys, and storing encrypted data and a result of the calculation of the threshold logic. The decryption step includes the following steps of restoring the new key from k secret keys selected from the n secret keys and the stored result of the threshold logic calculation in accordance with a threshold reverse logic corresponding to the threshold logic and decrypting by the restored key the encrypted and stored data in the common-key cryptographic scheme.

As a result of this method, after the information is encrypted, it is not necessary to again distribute secret information to the bearers and hence the distributor organization becomes unnecessary. Moreover, the absence of the distributor accordingly removes the fear that the secret information is known to the distributor.

Additionally, by adopting an elliptic curve cryptosystem as the public key cryptosystem, the processing speed can be increased.

BRIEF DESCRIPTION OF THE DRAWINGS

The objects and features of the present invention will become more apparent from the consideration of the following detailed description taken in conjunction with the accompanying drawings in which.

Figure 1:
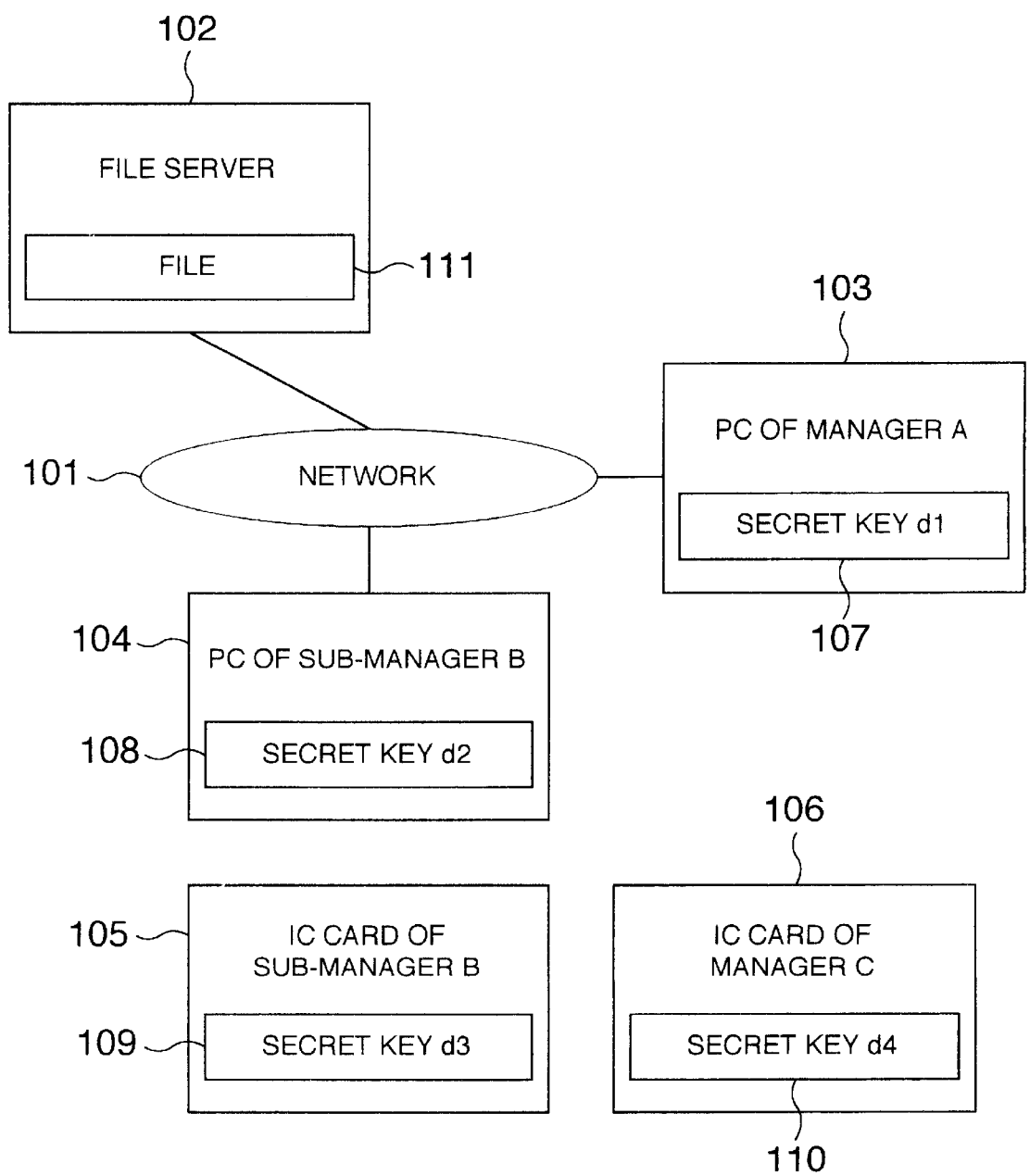
FIG. 1 is diagram showing an example of a network system in accordance with the present invention.

DESCRIPTION OF THE PREFERRED EMBODIMENTS (1) System Configuration

Description will be given of an embodiment in accordance with the present invention by referring to the drawings.

FIG. 1 is a schematic configuration diagram of a data management system constructed in accordance with the present invention. In the system, a file server 102 to manage a file 111, a computer (PC) 103 of manager A in which a secret key d1 107 is memorized, and a computer 104 of sub-manager B in which a secret key d2 108 is memorized are connected to each other via a network 101. Moreover, it is assumed that sub-manager B has an IC card B 105 in which a secret key d3 109 is memorized and secretary C has an IC card C 106 in which a secret key d4 110 is memorized.

In the configuration, the network is a general network, e.g., a local area network (LAN).

The file server 102 and the computers 103 and 104 are computers including a personal computer and a work-station and each thereof includes a memory, a central processing unit (CPU), and a communication interface.

Each of the IC cards 105 and 106 includes a memory, a CPU, and an interface to input and to output data to and from the memory.

Between the file server 102 and the computers 105 and 106 as well as between the computers 105 and 106, data is transferred in accordance with a protocol, e.g., TCP/IP adopted by the network 101.

This system achieves integer-operation for data having a long bit length, e.g., 160-bit data, which will be described later. Therefore, each of the computers and IC cards may include a processor dedicated for the integer operation or may include a logic of software and/or firmware which subdivides an integer having a long bit length into data having an ordinary bit length, e.g., 32-bit data for the operation.

In this example, an elliptic curve cryptosystem is adopted as the public-key cryptosystem. The system manager determines an elliptic curve for each system, and software to generate a pair of a secret key and a public key is distributed to each member (each computer and each IC card in this example) of the system. Each member generates keys to keep the secret key (d1 to d4) in its own memory and to open to public the public key (Q1 to Q4).

Moreover, each member of the system has software for a hashing function, file encryption and decryption, and a calculating formula of a threshold logic to conduct processing which will be described later.

Although the example of FIG. 1 includes a file server, two computers, and two IC cards, the numbers of the constituent apparatuses are not restricted by this example. The IC card need not be necessarily used.

(2) File Encryption

EXAMPLE 1

Description will be given of an example in which a computer having an original file encrypts a file and then sends the encrypted file via a network to the file server 102. The file serve 102 stores the received file 111 in a storage.

In this example, it is assumed that the computer 103 of the manager A encrypts the file.

Figure 2:
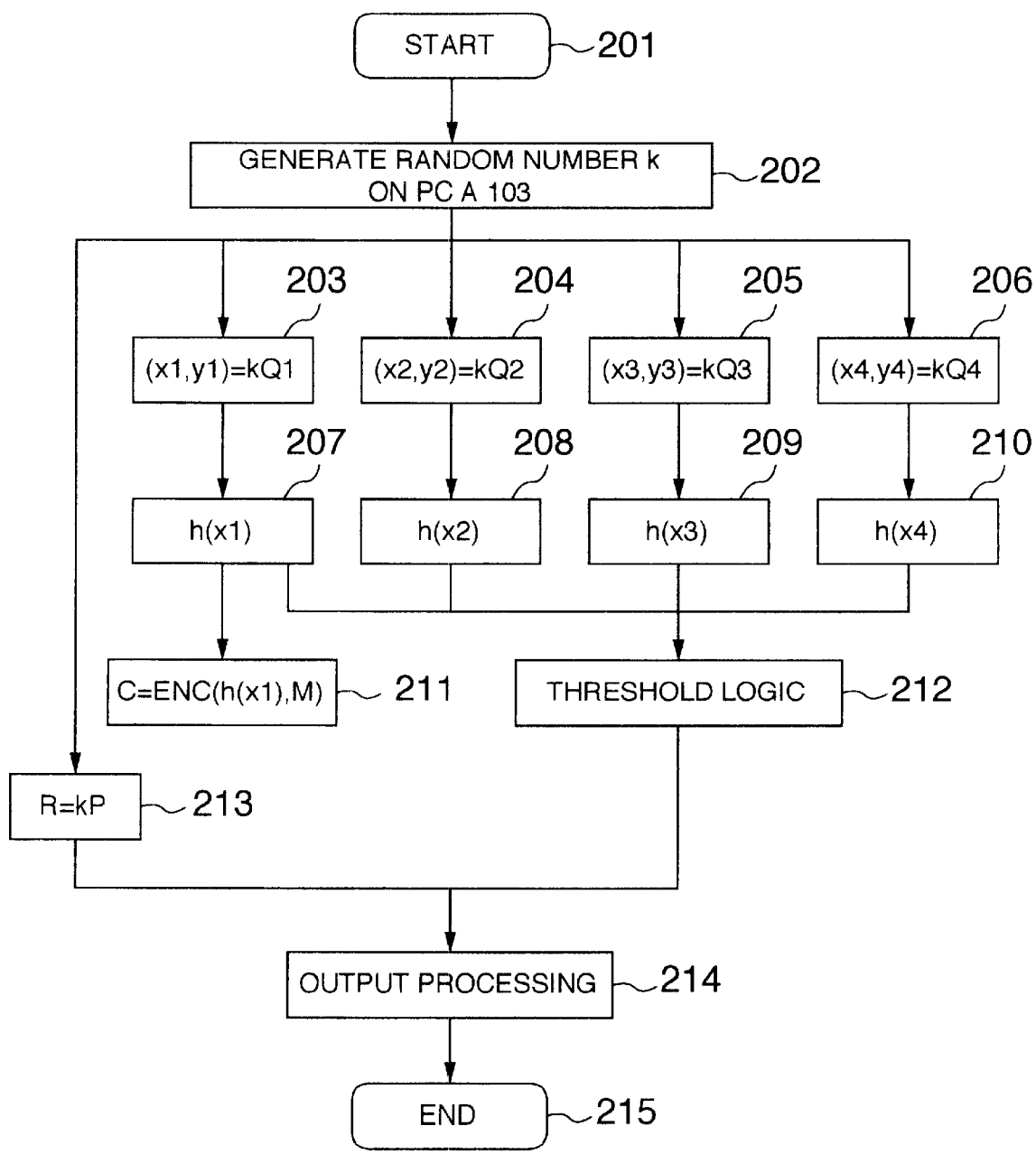
FIG. 2 is a flowchart showing an example of operation to encrypt a file with a threshold logic.

First, a method of encrypting the file will be described. FIG. 2 is a flowchart showing details of the method.

Step 201: Start.

Step 202: Random number k is generated by the computer 103 of the manager A.

The random number k is an positive integer and is less than an order of a base point of the elliptic curve used in the system; moreover, the number k has a bit length equal to that of the secret key, e.g., 160 bits.

Step 203: Using a public key Q1 corresponding to the secret key d1 107 and the random number k, an operation is achieved on an elliptic curve, specifically, a scalar multiplication is conducted to resultantly attain (x1,y1).

Step 204: Using a public key Q2 corresponding to the secret key d2 108 and the random number k, an operation is achieved on an elliptic curve to attain (x2,y2) as a result.

Step 205: Using a public key Q3 corresponding to the secret key d3 109 and the random number k, an operation is achieved on an elliptic curve to resultantly attain (x3,y3).

Step 206: Using a public key Q4 corresponding to the secret key d4 110 and the random number k, an operation is achieved on an elliptic curve to attain (x4,y4) as a result.

As described above, the public keys Q1 to Q4 are opened to public and hence available for any user. The public key Q1 is expressed in the format of x and y coordinates, and the values of x and Y are respectively integers which are equal to or more than 0 and which are less than the order of the field in which the elliptic curve is defined. The software for the operation on the elliptic curve may be distributed to the members together with the key generating logic or may be opened to public together with the public key. A result of the operation on the elliptic curve is represented in the same format as for the public key.

Step 207: The value of x1 resultant from the operation in step 203 is inputted in a hashing function h to obtain a hash value h(x1).

Step 208: The value of x2 resultant from the operation in step 204 is inputted in a hashing function h to obtain a hash value h(x2).

Step 209: The value of x3 resultant from the operation in step 205 is inputted in a hashing function h to obtain a hash value h(x3).

Step 210: The value of x4 resultant from the operation in step 206 is inputted in a hashing function h to obtain a hash value h(x4).

Step 211: Setting the hash value h(x1) obtained in step 207 to an encryption/decryption key, the original file, namely, data M is encrypted to obtain encrypted data C as a result.

In the encryption in step 211, there is adopted a common-key cryptosystem in which the encryption and the decryption utilize the same key. Although there is representatively utilized Data Encryption Standard (DES), another method may be used. The hashing function in steps 207 to 210 may be any function which generates a hash value having the bit length equal to or more than the key length used in the common-key cryptosystem. Representatively, there is adopted SHA-1. The common-key cryptosystem and the hashing function have desirably higher safety. In steps 207 to 210, there may be used the same hashing function or a plurality of different hashing functions. When the length of the hash value is greater than the key length, the hash value is partially utilized. The hash value length of SHA-1 is 160 bits and the key length of DES is 56 bits. In this case, the 56 leading, the 56 trailing bits, or the like of the hash value are extracted to be used as a key.

Step 212: Computation is conducted in accordance with a threshold logic. Assume as an example of the logic that the decryption can be achieved only with the secret key d1. Moreover, the decryption can carried out only when there are available two keys selected from the secret keys d2, d3, and d4.

Assume that the input values to the threshold logic include the hash values h(x1), h(x2), h(x3), and h(x4) calculated in steps 207 to 210 and the x coordinate value of the public key Q1. In this situation, the system computes the following simultaneous system of equations with four unknowns to obtain outputs f1 and f2.

$$f1=a1h(x1)+a2h(x2)+a3h(x3)+a4h(x4)$$
$$f2=b1h(x1)+b2h(x2)+b3h(x3)+b4h(x4)$$

Where, ai and bi (i=1, 2, 3, 4) are constants obtained through computations with the x coordinate value of Q1 and are, for example, a coefficient matrix called Vandermonde matrix commonly used in a secret information sharing method.

Step 213: In accordance with a base point P on the elliptic curve and the random number k, an operation is conducted on the elliptic curve to attain R(x,y) as a result of operation.

The base point P and the result of operation R are expressed with x and y coordinates in the same format as for the public key, namely, each thereof has an integer which has long bit length and which is equal to or more than 0. The base point P may be distributed to each member together with the key generating software for the elliptic curve cryptosystem or may be opened together with the public key.

Step 214: An output processing is carried out to output an encrypted sentence, i.e., data C attained through the operation in step 211, R calculated in step 213, and f1 and f2 calculated in step 212.

Step 215: End.

In the processing above, the computer 103 sends the generated data C to the file server 102 to store the data C in the file 111. The data items R, f1 and f2 attained in step 214 are also stored with a correspondence established between the data items and the data C. The data R, f1, and f2 may be kept in the file 111 together with the encrypted data C or may be stored via a network in a location with other public data, the location being accessible from any user.

The hashing function, the relationship between the public key and the hashing function, the correspondence between the hash values and encrypted keys, the public-key cryptosystem, and the coefficient matrix of the threshold logic may be uniquely determined in the system or may be determined for each data to be encrypted. In the former case, these items may be incorporated in the program shown in FIG. 2. In the latter case, like the data R, f1, and f2, these items are kept in the format linked with the encrypted data C in a location which can be accessed by any user.

In FIG. 2, steps 203 to 210 are described in a parallel fashion only to clarify the relationship between the threshold logic and the public key Q. If the computer to encrypt the file includes only one processor, these processing steps are serially achieved.

The steps above utilizes public keys and random numbers generated by a computer which executes the steps of FIG. 2. That is, these steps can be executed by another computer.

(3) File Decryption

EXAMPLE 1

Next, description will be given of a method of decrypting the file (data) encrypted in example 1 described above. In the preceding example, a value of h(x1) related only to the secret key d1 is adopted as the encryption key. Therefore, the person, manager A in this case, who knows the secret key d1 can decrypt the file. When the secret key d1 is unknown, the decryption is possible only if a plurality of secret key bearers, two persons in this case, agree to the decryption in accordance with the threshold logic. Both of the decryption methods will next be described.

(A) File Decryption by Manager A

Figure 3:
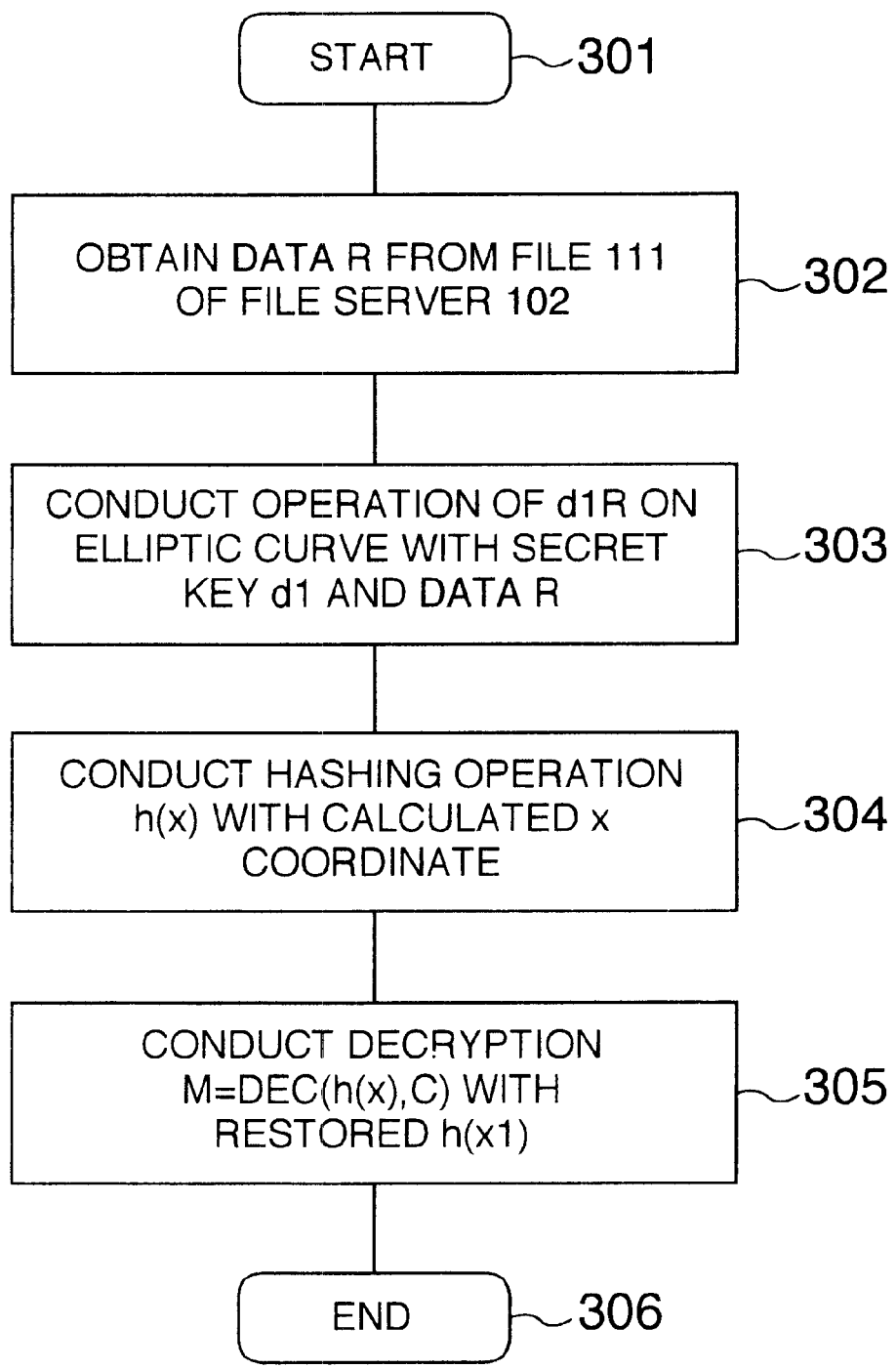
FIG. 3 is a flowchart showing operation in which manager A decrypts a file with a secret key d1 on a network.

Description will be given of a method of decrypting a file with a secret key d1 of manager A by referring to FIG. 3.

Step 301: Start.

Step 302: The computer 103 operates a communicating function thereof and accesses via the network the file 111 stored in the file serve 102 or in a location accessible from any user so as to obtain data R therefrom.

Step 303: Using data R obtained in step 302 and the secret key d1 stored in a storage of the computer 103 of manager A, an operation of (x,y)=d1R is executed on an elliptic curve as follows. Values attained from the operation are regarded as (x1,y1) in accordance with the following relationship.

$$(x,y)=d1R=d1(kP)=k(d1P)=kQ1=(x1,y1)$$

Step 304: Operation result x1 is inputted in the hashing function h to restore the encryption/decryption key h(x1) used for the file encryption.

Step 305: With the key h(x1) restored in step 304, the encrypted data C read from the file 111 is decrypted to resultantly obtain data M. p0 Step 306: End.

The hashing function h for x1 and the relationship between h(x1) and the encryption/decryption key are required to be equal to those of the encryption shown in FIG. 2. Moreover, the decryption in step 305 must be accomplished in a decryption method corresponding to the encryption method adopted in step 211 of FIG. 2.

The steps above is implemented when a CPU of the computer 103 of manager A executes a program stored in a storage of the computer 103.

(B) File Decryption Through Threshold Control

Description will be given of a decryption method in which the decryption is conducted in accordance with a reverse logic of the threshold logic used in the file encryption when two keys selected from the secret keys d2, d3, and d4 are available.

In the description of the decryption method, it is assumed that while sub-manager B possessing the IC card B 105 is being absent from the office, the secretary C having received a request for decryption of a file decrypts the file from the computer 104 of sub-manager B by use of the own IC card C 106.

The decryption method will now be described by reference to FIG. 4.

Step 401: Start.

Step 402: The file 111 of the file serve 102 or a location accessible from any user is accessed via the network 101 so that the data R, f1, and f2 is read therefrom.

Step 403: Using data R attained in step 402 and the secret key d2 of the computer 104 of sub-manager B, an operation of (x,y)=d2R is conducted on an elliptic curve. Values resultant from the operation are (x2,y2) in accordance with a relationship similar to that of step 303 of FIG. 3.

Step 404: The operation result x2 is inputted in the hashing function h to attain the hash value h(x2).

Step 405: Using data R obtained in step 402 and the secret key d4 stored in the IC card 106 of the secretary C, an operation of (x,y)=d4R is accomplished on an elliptic curve. Values obtained through the operation become (x4,y4) in accordance with a relationship similar to that of step 303.

Step 406: The operation result x4 is inputted in the hashing function h to attain the hash value h(x4). However, the operation of steps 405 and 406 is implemented when a processor in the IC card 106 receives data R from the computer 104 and executes a program stored in the IC card 106 in accordance with the secret key d4 stored in the card 106, which will be described later.

Step 407: Using f1 and f2 obtained in step 402, h(x2) attained in step 404, h(x4) resultant from execution of the step 406, and the public key Q1 which is public information, the key h(x1) used to encrypt the file is restored in accordance with a threshold reverse logic.

In the steps above, any secret key is desired to be kept remained in the computer and the IC card associated therewith, namely, the key should not be transmitted in its original form to any other external device. When the secret key is sent as data through the network, the fear of stealing thereof is increased. Consequently, steps 403 and 404 and steps 405 and 406 are respectively executed in a computer or an IC card in which the secret key is kept. In a case in which the computer or the IC card (IC card 106 in this example) to execute these steps is different from the computer (computer 104 in this case) to achieve the file decryption, there are additionally executed steps as follows.

Step 410: The computer 104 sends a hash processing request to the IC card 106 together with data R.

Step 411: The computer 104 receives a hash value of h(x4) from the IC card 106.

While the IC card 106 is executing steps 405 and 406, the computer 104 is in a wait state of executes another processing (in the same way as for the ordinary distributed processing).

The data R and the hash value are transmitted via a network and/or a computer-IC card interface. In step 410, the hashing function to be used in step 406 may be transmitted together with the data R.

The hashing function adopted in steps 404 and 406 is the same as that used for the encryption in FIG. 2.

Description will now be given further of the threshold reverse logic.

Expressions employed in the threshold logic become a simultaneous system of equations with four unknowns $h(x1)$, $h(x2)$, $h(x3)$, and $h(x4)$ as follows when f1, f2, and public key Q1 (or a coefficient matrix of ai and bi) are given.

$$f1 = a1 h(x1) + a2 h(x2) + a3 h(x) + a4 h(x4)$$

$$f2 = b1 h(x1) + b2 h(x2) + b3 h(x3) + b4 h(x4)$$

When $h(x2)$ and $h(x4)$ are obtained, there remain two unknowns $h(x1)$ and $h(x3)$ and hence $h(x1)$ can be derived from a simultaneous system of equations with two unknowns. Step 408: The encrypted data C is read from the file server 102 such that the encrypted data C is decrypted to attain data M in accordance with the encryption/decryption key $h(x1)$ restored in step 407.

Step 409: End.

Figure 4:
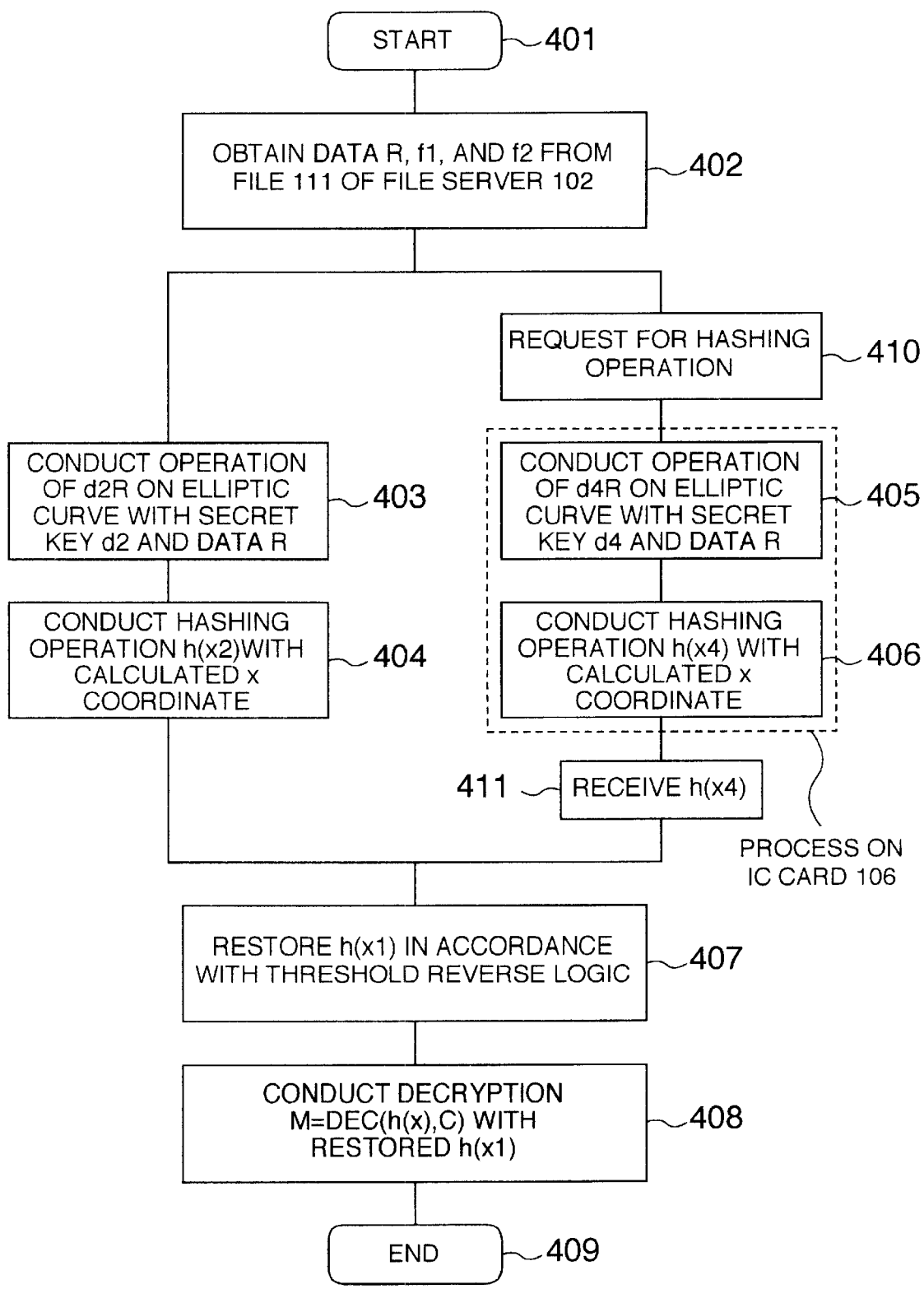
FIG. 4 is a flowchart showing operation in which secretary C decrypts a file with a secret key d2 and a secret key d4 on a network.

In FIG. 4, steps 403 to 406, 410, and 411 are processed in a parallel fashion. This is only to clarify the relationship between the hash value and the threshold reverse logic.

Incidentally, for example, when the secret key d2 108 cannot be read due to a failure of the personal computer (PC) 104 of sub-manager B, this embodiment is also applicable by replacing the secret key d2 with the secret key d3 in the IC card 105 so as to carry out the file decryption.

The decryption is executed by the computer 104 in the description above. However, the present invention is not restricted by the embodiment, namely, when necessary data is received, the operation can be achieved by another computer, e.g., the file serve 102.

(4) File Encryption

EXAMPLE 2

In the file encryption/decryption processing described in conjunction with example 1, the decryption can be conducted, only with the secret key d1, and the decryption can be achieved when two of three keys d2, d3, and d4 are available and the decryption is impossible when only one thereof is available. However, various kinds of threshold control are possible by changing the threshold logic.

For example, although the encryption key used in the file encryption is a hash value $h(x1)$ derived from the public key Q1, it may also be possible to use as the encryption key a hash value $h(x1\|x2\|x3\|x4)$ which is a total of partial information of the value derived from four public keys such that the value is subjected to the secret sharing in accordance with the threshold logic.

Symbol $\|$ represents an operator for "concatenation", namely, $x1\|x2\mu x3\|x4$ simply indicates a long joined bit sequence of x1 to x4.

For example, a (2,4) threshold secret sharing logic is as follows.

$$g1 = s1 h(x1\|x2\|x3\|x4) + s2 h(x1) + s3 h(x2) + s4 h(x3) + s5 h(x4)$$

$$g2 = t1 h(x1\|x2\|x3\|x4) + t2 h(x1) + t3 h(x2) + t4 h(x3) + t5 h(x4)$$

$$g3 = u1 h(x1\|x2\|x3\|x4) + u2 h(x1) + u3 h(x2) + u4 h(x3) + u5 h(x4)$$

When si, ti, and ui (i=1, 2, 3, 4, 5) of the expressions above are assumed to be constants which can be calculated in association with the public key Qj (j=1, 2, 3, 4), there are obtained a simultaneous system of equations with five unknowns $h(x1\|x2\|x3\|x4)$, $h(x1)$, $h(x2)$, $h(x3)$, and $h(x4)$. In this case, when at least two of the secret keys are obtained, the number of unknowns become three and hence there are obtained a simultaneous system including three equations. By solving the simultaneous equation system, there is attained an encryption key, i.e., $h(x1\|x2\|x3\|x4)$. In this method, there can be configured a system in the network system above in which the encryption/decryption key cannot be obtained with, for example, only the secret key of the manager.

Figure 5:
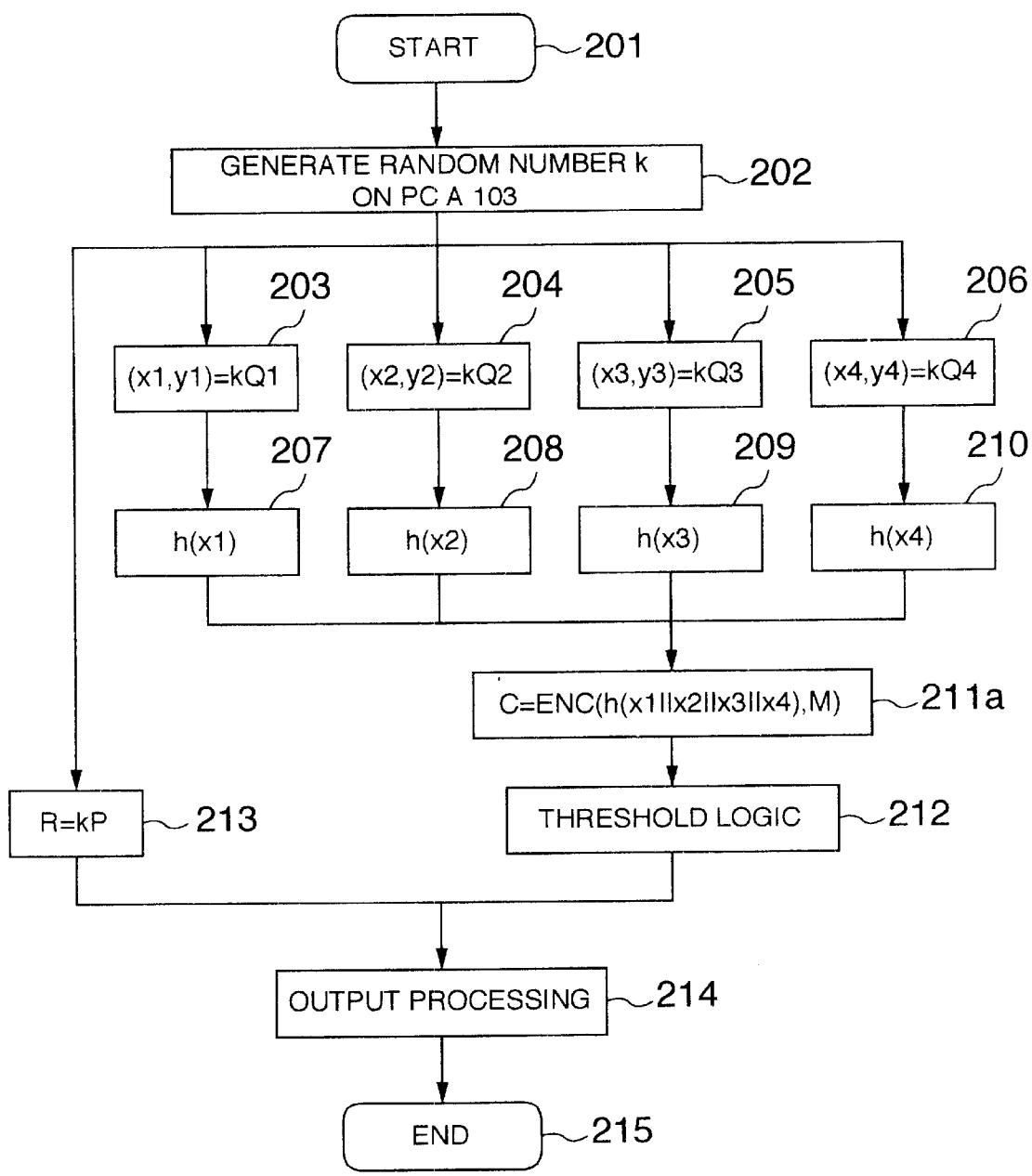
FIG. 5 is a flowchart showing another example of operation to encrypt a file in accordance with a threshold logic.

FIG. 5 shows a process of the encryption. Most steps are the same as those of the process of FIG. 2. However, FIG. 5 differs from FIG. 2 in that the key $h(x1\|x2\|x3\|x4)$ associated with the values x1 to x4 resultant from steps 203 to 206 are used in step 211a.

(5) File Decryption

EXAMPLE 2

The sentence C encrypted through the process 5 is decrypted in a method similar to that described in section (3)(B) by referring to FIG. 4. However, in step 407, $h(x1\|x2\|x3\|x4)$ is restored in accordance with a threshold reverse logic; moreover, $h(x1\|x2\|x3\|x4)$ is used as a key for the decryption in step 408.

In general, it is possible to construct a threshold logic in which a file can be encrypted when k secret keys are obtained from n secret keys (k is equal to or less than n) and the file encryption/decryption is impossible with (k−1) secret keys or less. This ensures reliability and safety of the system.

(6) Update of Key

Description will be next given of a method of coping with the key loss and destruction by referring to the case of the embodiment above.

In conjunction with the embodiment, description has been given of a control operation with a threshold logic employing four keys. However, even when two particular keys thereof are lost or destroyed, the file decryption is possible. Consequently, when even one of the keys is lost or destroyed, the file is immediately and temporarily decrypted with either two of three remaining keys.

Thereafter, a new public key and a new secret key are generated in place of the lost or destroyed keys. In this situation, all keys, i.e., four keys may be again generated. Using the set of these new keys, the file is again encrypted.

Thanks to this method, even when (n−k) keys are lost and/or destroyed in a system employing a (k,n) threshold logic, it is possible to decrypt the encrypted sentence in any case.

(7) Modifications

In the example above, each of four persons has a secret key. However, the present invention can also be applied to a case in which a secret key is assigned to each two or more persons.

The example above adopts an elliptic curve cryptosystem which uses a group generated by a rational point on the elliptic curve. However, in place of an elliptic curve cryptosystem, there may be utilizes a cryptosystem using one of other group structures, specifically, the Jacobian group of a hyperelliptic curve or a $C_{AB}$ curve, a subgroup of the Jacobian group, and a subgroup of an integral ring.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data encryption/decryption method comprising:

a data encryption step; and a data decryption step, wherein the encryption step comprises the steps of:
preparing n pairs of secret keys and public keys in a public-key cryptographic scheme, where n is an integer greater than or equal to 2, generating a new key using at least two of the public keys, encrypting data in a common-key cryptographic scheme by use of the new key, preparing a (k,n) threshold logic (k is an integer equal to or less than n) having terms associated with the new key and the n public keys, conducting a calculation of the threshold logic by use of the new key and the n public keys, and storing encrypted data and a result of the calculation of the threshold logic; and wherein the data decryption step comprises the steps of:
restoring the new key from k secret keys selected from the n secret keys and the stored result of the threshold logic calculation in accordance with a threshold reverse logic corresponding to the threshold logic, and decrypting by the restored key the encrypted and stored data in the common-key cryptographic scheme.

2. A data encryption/decryption method comprising:

a data encryption step; and a data decryption step, wherein the encryption step comprises the steps of:
preparing n pairs of secret keys and public keys in a public-key cryptographic scheme, where n is a positive integer, generating a new key using at least one of the public keys, encrypting data in a common-key cryptographic scheme by use of the new key, preparing a (k,n) threshold logic (k is an integer equal to or less than n) having terms associated with the new key and the n public keys, conducting a calculation of the threshold logic by use of the new key and the n public keys, and storing encrypted data and a result of the calculation of the threshold logic; and wherein the data decryption step comprises the steps of:
restoring the new key from k secret keys selected from the n secret keys and the stored result of the threshold logic calculation in accordance with a threshold reverse logic corresponding to the threshold logic, and decrypting by the restored key the encrypted and stored data in the common-key cryptographic scheme, wherein the public-key cryptographic scheme is an elliptic curve cryptosystem in which a constant related to the elliptic curve cryptosystem is stored together with the encrypted data, and wherein the constant being used in the decryption step.

3. A data encryption/decryption method comprising:

a data encryption step; and a data decryption step, wherein the encryption step comprises the steps of:
preparing n pairs of secret keys and public keys in a public-key cryptographic scheme, where n is a positive integer, generating a new key using at least one of the public keys, encrypting data in a common-key cryptographic scheme by use of the new key, preparing a (k,n) threshold logic (k is an integer equal to or less than n) having terms associated with the new key and the n public keys, conducting a calculation of the threshold logic by use of the new key and the n public keys, and storing encrypted data and a result of the calculation of the threshold logic; and wherein the data decryption step comprises the steps of:
restoring the new key from k secret keys selected from the n secret keys and the stored result of the threshold logic calculation in accordance with a threshold reverse logic corresponding to the threshold logic, and decrypting by the restored key the encrypted and stored data in the common-key cryptographic scheme, and wherein the step of generating the new key using the public key uses a hashing function.

4. A data encryption/decryption method in accordance with claim 2, wherein:

the constant is calculated in accordance with a base point of the elliptic curve and a random number;

the new key is a hash value of value calculated in accordance with the public key and the random number; and the threshold logic is a simultaneous system of equations having as terms the hash values of values calculated in accordance with the public keys and the random number, and the new key.

5. A data encryption/decryption method in accordance with claim 4, wherein the step of restoring the new key includes the step of inputting hash values of the values resultant from a calculation using the secret keys and the constant into the threshold reverse logic.

6. A data encryption/decryption method comprising:

a data encryption step; and a data decryption step, wherein the encryption step comprises the steps of:
preparing n pairs of secret keys and public keys in a public-key cryptographic scheme, where n is a positive integer, generating a new key using at least one of the public keys, encrypting data in a common-key cryptographic scheme by use of the new key, preparing a (k,n) threshold logic (k is an integer equal to or less than n) having terms associated with the new key and the n public keys, conducting a calculation of the threshold logic by use of the new key and the n public keys, and storing encrypted data and a result of the calculation of the threshold logic; and wherein the data decryption step comprises the steps of:
restoring the new key from k secret keys selected from the n secret keys and the stored result of the threshold logic calculation in accordance with a threshold reverse logic corresponding to the threshold logic, and decrypting by the restored key the encrypted and stored data in the common-key cryptographic scheme, wherein said data encryption/decryption method further comprising the steps, which are to be executed when (n−k) secret keys or less becomes unavailable, of:

decrypting the encrypted and stored data by using at least k remaining secret keys, preparing a new pair of a secret key and a public key for each of the unavailable keys or for each of all keys, and encrypting again the decrypted data by use of the new public key.

7. A network system, comprising:

n apparatuses connected to a network for respectively storing therein secret keys in a public-key cryptographic scheme, where n is a positive integer; and a server connected to the network to be accessible from either one of the apparatuses, the server storing therein all public keys corresponding to the secret keys, wherein the apparatus for encrypting data includes:

means for generating a new key in accordance with at least one of the public keys, means for encrypting data in a common-key cryptographic scheme by use of the new key, means for conducting a calculation of a (k,n) threshold logic (k is an integer equal to or less than n) having terms associated with the new key and the n public keys using the new key and the n public keys, and means for storing encrypted data and a result of the calculation of the threshold logic in the server; and wherein the apparatus for decrypting data includes:

means for reading the encrypted data and the result of the calculation of the threshold logic from the server, means for obtaining from the apparatus k values which are respectively related to the secret keys and which are necessary for a calculation of a threshold reverse logic corresponding to the threshold logic, means for restoring the new key from the result of the threshold logic calculation thus read from the server and the obtained values in accordance with the threshold reverse logic, and means for decrypting by the restored key the data in the common-key cryptographic scheme.

8. A network system in accordance with claim 7, wherein some of the n apparatuses for storing therein secret keys in a public-key cryptographic scheme are IC cards capable of being connected to the network system via computers or another devices.

9. A network system in accordance with claim 7, wherein the public-key cryptographic scheme is an elliptic curve cryptosystem;

wherein in the encrypting apparatus:

the new key generating means sets as a new key a hash value of values calculated using at least one of public keys and a random number, the calculating means conducts the calculation of the threshold logic using as variables the hash values of the values calculated in accordance with the public keys and a random number and the new key, and the storing means of the encrypting apparatus calculates a constant related to the elliptic curve cryptosystem in accordance with a base point of an elliptic curve and the random number and stores the constant together with the encrypted data; and wherein in the decrypting apparatus:

the reading means reads the constant, and the means for obtaining the k values obtains the hash values as results of calculations using the secret keys and the constant.

10. A network system in accordance with claim 9, wherein the means for obtaining the k values sends the constant to another apparatus having the secret key together with a hashing operation request of the secret key and receives the hash value from the apparatus to which the request has been issued.

11. A network system in accordance with claim 10, wherein each of the apparatuses comprises:

means for receiving the hashing operation request of the secret key;

means for conducting a hashing operation for a result of a calculation between the constant transmitted together with the hashing operation request and the secret key stored in the apparatus; and means for sending the hash value to the transmission source of the hash operation request.

12. A data encryption program stored on a storage medium for encrypting data, wherein said data encryption program when executed causes a computer to perform the steps of:

preparing n pairs of secret keys and public keys in a public-key cryptographic scheme, where n is an integer greater than or equal to 2;

generating a new key in accordance with at least two of the public keys;

encrypting data in a common-key cryptographic scheme by use of the new key;

preparing a (k,n) threshold logic (k is an integer equal to or less than n) having terms associated with the new key and the n public keys;

conducting a calculation of the threshold logic by use of the new key and the n public keys; and storing encrypted data and a result of the calculation of the threshold logic.

13. A data decryption program stored on a storage medium for decrypting data encrypted by the data encryption program in accordance with claim 12, wherein said data decryption program when executed cause a computer to perform the steps of:

restoring a key from k secret keys selected from predetermined n secret keys (n is an integer greater than or equal to 2 and k is a positive integer equal to or less than n) and the stored result of the threshold logic calculation in accordance with a threshold reverse logic corresponding to the threshold logic; and decrypting by the restored key the encrypted and stored data in the common-key cryptographic scheme.

14. A data encryption/decryption method comprising:

a data encryption step; and a data decryption step, wherein the encryption step comprises the steps of:

preparing n number of secret keys and at least one public key in a public-key cryptographic scheme, where n is a positive integer, generating a new key using at least one of the public key, encrypting data in a common-key cryptographic scheme by use of the new key, and storing the encrypted data, and wherein the data decryption step comprises the steps of:

restoring the new key from k secret keys selected from the n secret keys, and decrypting by the restored key the encrypted and stored data in the common-key cryptographic scheme.

* * * * *